United States Patent [19]

Cila et al.

[11] 3,846,697

[45] Nov. 5, 1974

[54] DIGITAL PICKUP
[75] Inventors: Otakar Cila; Dudley D. Nye, Jr., both of Fort Lauderdale, Fla.
[73] Assignee: Airpax Electronics Incorporated, Fort Lauderdale, Fla.
[22] Filed: Nov. 14, 1972
[21] Appl. No.: 306,287

[52] U.S. Cl............ 324/34 GT, 307/237, 307/278, 324/46, 324/174
[51] Int. Cl......................... G01p 3/48, G01p 1/02
[58] Field of Search............ 307/278, 237; 324/174, 324/179, 34 R, 34 GT, 34 PS, 34 D, 46

[56] References Cited
UNITED STATES PATENTS

| | | | |
|---|---|---|---|
| 2,948,852 | 8/1960 | Bacon | 324/174 |
| 3,366,874 | 1/1968 | Kühne | 324/174 X |
| 3,422,282 | 1/1969 | Orrell | 307/237 X |
| 3,466,463 | 9/1969 | Moses | 307/237 |
| 3,596,114 | 7/1971 | Maupin et al. | 307/278 |
| 3,613,000 | 10/1971 | Weir et al. | 324/174 |
| 3,721,968 | 2/1972 | Gee | 324/174 X |

OTHER PUBLICATIONS

RCA Linear Integrated Circuits Manual (No. IC-42), pages 80–81, Aug. 1970, RCA, Somerville, N.J., 08876.
"Tachometry In Industry," Industrial Electronics, Nov. 1963, pages 713–715.
Wehmer, "Electromagnetic Tachometer," IBM Tech. Discl. Bull., Vol. 11, No. 7, Dec. 1968, pp. 746–747.

*Primary Examiner*—Rudolph V. Rolinec
*Assistant Examiner*—William D. Larkins
*Attorney, Agent, or Firm*—LeBlanc & Shur

[57] ABSTRACT

Disclosed is a digital pickup for counting gear teeth and the like down to zero speed. A pair of magneto-resistors mounted on a permanent magnet sense the gear teeth. The magneto-resistors are connected in a bridge circuit and the bridge output triggers an integrated circuit switch incorporated in the pickup to produce a high voltage, low impedance digital output particularly suited for TTL logic.

2 Claims, 9 Drawing Figures

PATENTED NOV 5 1974 3,846,697

DIGITAL PICKUP

This invention relates to a digital pickup suitable for use as a tachometer or gear tooth counter, and more particularly is directed to a pickup which employs magneto-resistors and which is independent of speed. While described in conjunction with the sensing of gear teeth, it is understood that the pickup of the present invention is applicable to the sensing of all types of magnetic discontinuities.

Proximity pickups in the past have for the most part utilized one or more electrical coils in combination with a magnetic circuit. Such devices are designed to sense material rather than discontinuities in materials and are very unsatisfactory for sensing and counting gear teeth down to zero speed or zero rpm since electrical adjustment must be made at each installation to correspond to the "pickup-to-gear" spacing. In addition, prior constructions have required fairly complex electrical circuitry not suitable for reduction in size to the space available in a sensor or pickup and the stability of the biasing required is questionable.

These and other difficulties are overcome in the present invention by providing a magnetic pickup incorporating magneto-resistors in combination with a novel electrical pickup circuit incorporated directly in the sensing head. Magneto-resistors are commercially available devices which are mounted on a permanent magnet in the vicinity of a ferromagnetic gear. The pickup senses the non-symmetrical proximity of the ferrous material in the immediate vicinity of the sensing tip and this situation occurs whenever a gear tooth is off center. A novel electrical bridge compensates for temperature sensitivity and the bridge output is zero when the sensed material is symmetrically oriented. No electrical adjustments are needed after the "pickup-to-gear" spacing is reduced below the initial capture or operating gap. The magneto-resistor sensing head, in combination with the built-in electronic circuit, provides fast switching output between zero and 5 volts (zero volts is the logic zero and 5 volts is the logic 1). The electronic circuit also provides a great deal of noise immunity due to its threshold/hysteresis characteristic.

It is therefore one object of the present invention to provide an improved digital pickup.

Another object of the present invention is to provide a digital pickup in which an electrical circuit is combined directly with the sensing head.

Another object of the present invention is to provide a proximity-type sensor incorporating magneto-resistors.

Another object of the present invention is to provide a simplified and relatively inexpensive digital pickup which is independent of gear speed.

Another object of the present invention is to provide an improved proximity pickup or magnetic sensor which is substantially independent of pickup-to-gear spacing.

Another object of the present invention is to provide a magneto-resistor pickup having increased sensitivity and reliability.

These and further objects and advantages of the invention will be more apparent upon reference to the following specification, claims, and appended drawings, wherein:

Figure 1:
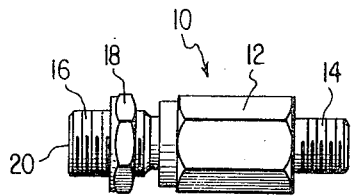
FIG. 1 is an elevational view of a digital magneto-resistive pickup constructed in accordance with the present invention.
Figure 2:
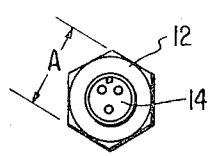
FIG. 2 is an end view of the pickup of FIG. 1.

Referring to the drawings, the novel pickup of the present invention is generally indicated at 10 in FIG. 1. The pickup comprises a hexagonally-shaped housing or casing 12 on which is mounted an externally threaded cable connector 14 adapted to mate with the connector of a standard electrical cable, such as that identified as MS 3106A-10SL-3S. Also connected to housing 12 is a hollow externally threaded mounting stud 16 which threadably receives a locknut 18 for mounting the pickup on a suitable support. By way of example only, the overall length of a pickup constructed in accordance with FIG. 1 was 3-5/16 inchs and the width A in FIG. 2 was 1 inch.

Figures 3, 4:
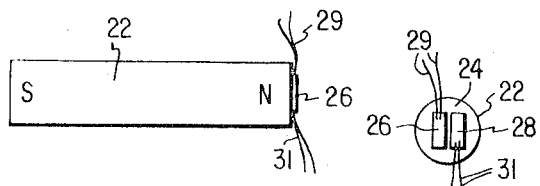
FIG. 3 is an elevational view of the sensing magnet forming a part of the digital pickup of FIG. 1.
FIG. 4 is an end view of the magnet of FIG. 3 showing the mounting of the magneto-resistors.

The elements described above are preferably made of suitable non-magnetic material, such as 303 Stainless Steel. Hollow stud 16 may have an open end but is preferably closed off at 20 to form what is conventionally called a blind end. Mounted within stud 16 with its sensing head adjacent the end or tip 20 of the stud is a solid cylindrical permanent magnet 22, illustrated in FIGS. 3 and 4. This magnet is preferably made from Alinco V and has mounted on its sensing tip 24 adjacent end 20 of the stud a pair of magneto-resistors 26 and 28 with appropriate leads 29 and 31 for connection to the electrical circuit within housing 12. The magneto-resistors are of conventional construction and are resistors which change resistance with the application of a magnetic field. By way of example only, they may be of the type currently available from the Siemens Corporation of Iselin, New Jersey, and identified as FP 30L100E. These have a basis resistance at 25° C of approximately 100 ohms. Other types of magneto-resistors may be employed if desired.

Figure 5:
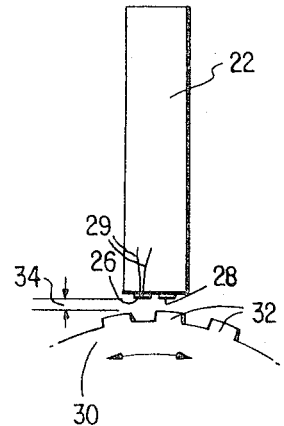
FIG. 5 illustrates the operating relationship between the gear and pickup.

FIG. 5 illustrates the physical relationship between the sensing tip and gear teeth during operation of the pickup. In FIG. 5, a gear of ferromagnetic material such as iron is illustrated at 30 with spaced gear teeth or magnetic discontinuities 32. The operating gap or spacing between the magneto-resistors 26 and 28 and the adjacent surface of the gear teeth is illustrated at 34. Typical values for this gap are 0 to .025 inch with a gear 30 having 20 pitch gear teeth and 0 to .050 inch with an 8 pitch gear. The recommended gear pitch is 20 DP or coarser.

Figure 6:
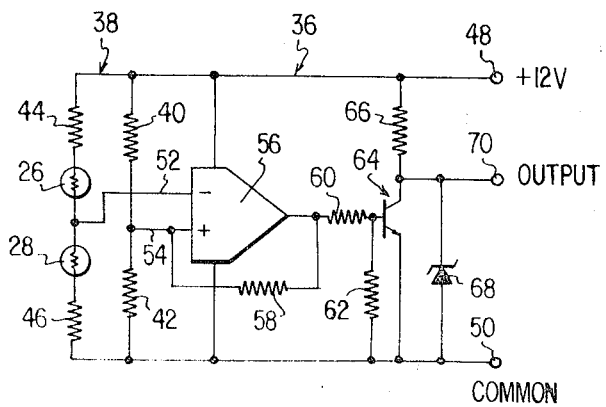
FIG. 6 is a circuit diagram of an electronic circuit incorporated directly into the pickup of FIG. 1.

FIG. 6 shows the electrical circuit, generally indicated at 36, which circuit is mounted in the housing 12. The magneto-resistors 26 and 28 are illustrated as a part of this circuit. The magneto-resistors are connected in a Wheatstone bridge generally indicated at 38 and comprising on one side the magneto-resistors 26 and 28 and on the other side the bridge resistors 40 and 42. The bridge preferably also includes a pair of current limiting resistors 44 and 46 for limiting the current through the magneto-resistors to a safe value. The bridge is connected to a suitable power supply, preferably of +12 volts, by way of positive power supply terminal 48 and common or grounded terminal 50. The bridge output developed across leads 52 and 54 is applied to the two input terminals of an integrated circuit operational amplifier 56. By way of example only, amplifier 56 may be of the integrated circuit type differential amplifier identified as LM 301A and is provided with positive feedback through a resistor 58. This resistor is connected from the operational amplifier output to the positive input terminal of the amplifier.

The output of the bridge is applied through series resistor 60 and bias resistor 62 to the base of an N-P-N junction transistor 64, preferably of the type identified as 2N3417. Connected to the collector of transistor 64 is a resistor 66 and a Zener diode 68. Transistor 64, resistor 66 and diode 68 are provided to condition the circuit output to be compatable with "TTL" (transistor-transistor-logic) devices to which the pickup is often connected. The output from the electrical circuit is developed between common terminal 50 and an output terminal 70 across Zener diode 68.

Figure 7:
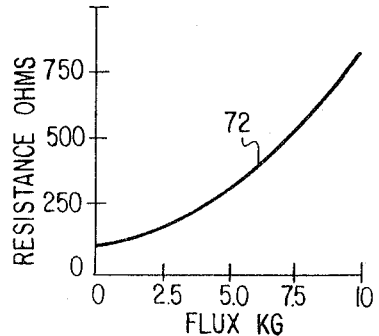
FIG. 7 is a plot of resistance versus flux showing the characteristics of a typical magneto-resistor.
Figure 8:
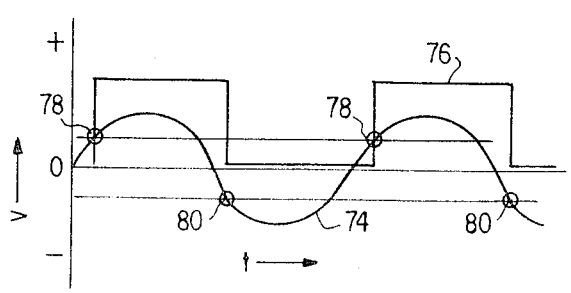
FIG. 8 is a plot of voltage versus time showing the relationship between the pickup output and the bridge output.
Figure 9:
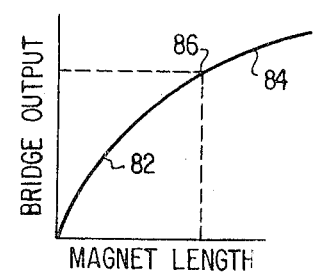
FIG. 9 is a plot of bridge output as a function of magnet length.

FIG. 7 is is a plot of resistance in ohms as a function of flux in kilogauss. It shows the characteristic curve 72 for a typical magneto-resistor used as the magneto-resistors 26 and 28. The resistance increases from a 0 flux value of approximately 100 ohms as the flux increases from 0 to approximately 10 kilogauss. FIG. 8 is a plot of voltage versus time and shows the relationship between the bridge output and the pickup output appearing across output terminals 50 and 70. The bridge output on leads 52 and 54 is illustrated as substantially a sine wave at 74 and the digital or square wave output of the pickup is illustrated at 76. The positive and negative operational amplifier trigger or threshold points are illustrated at 78 and 80, respectively. Square wave 76 switches between approximately 0 volts and a peak of approximately 5 volts at output terminal 70. FIG. 9 is a plot of bridge output on leads 52 and 54 as a function of the length of permanent magnet 22. This characteristic is illustrated by curve 82 in FIG. 9 and as can be seen this curve flattens out or levels off in the region 84 above an optimum value, generally indicated at 86.

In operation, the bridge containing the magneto-resistors 26 and 28 is initially balanced by selecting a suitable resistance value for resistor 40, which resistor, if desired, may be variable. This initial balance is accomplished at a time when there is no ferrous material near the sensing tip of the pickup. When the pickup is brought near a gear, such as gear 30 in FIG. 5, the bridge is unbalanced by a gear tooth, such as the gear tooth 32 directly across from magneto-resistor 28. There is a similar unbalance but in the opposite direction or of opposite polarity when a gear tooth 34 is centered directly across from the other magneto-resistor 26. The positive unbalance of the bridge 38 sets the trigger circuit comprising the operational amplifier 56 with positive feedback to a near 0 output and the negative unbalance resets the trigger circuit to its full or positive 5 volt output.

The actual arrangement of the magneto-resistors and the permanent magnet is optimized for maximum output from the bridge. If desired, the housing 12 may be provided with suitable flats or markings to indicate proper alignment of the magneto-resistors with the gear teeth. It has been found that with a given diameter permanent magnet, the bridge output increases with the length of the magnet as illustrated in FIG. 9. However, there is very little advantage to increasing the length of the magnet beyond that indicated by the knee of the curve. It has also been found that increasing the diameter of the magnet beyond that necessary to hold the magneto-resistors does not change or significantly increase the bridge output. The spacing of the magneto-resistors are set to give maximum bridge output when utilizing the largest pitch gear (fine teeth) in expected applications. Smaller pitch gears (coarser teeth) then provide even more bridge output. The optimum center-to-center spacing of the two magneto-resistors is approximately equal to half of the center-to-center distance between gear teeth. If desired, in place of the two magneto-resistors, a single center tap magneto-resistor may be utilized.

It is apparent from the above that the present invention provides an improved magnetic pickup device suitable for use as an analog/digital tachometer, a cut-to-length control, a production totalizing device, a zero speed switch, a process controller, a variable speed drive, and in many other applications. Important features of the pickup include operation to zero velocity, wide gap tolerance, operation without mechanical coupling, and a splashproof and dustproof construction. Magneto-resistors are combined in a common housing with a simplified switching electrical circuit to provide a digital output indicative of magnetic discontinuities passing by the pickup sensing tip. Through the use of a novel positive feedback operational amplifier construction, it is possible to provide an output with improved stability of the trigger points with changes in time and temperature. The operational amplifier is capable of operation with peak input signals as low as 100 millivolts, produces an improved signal to noise ratio and provides rapid switching between approximately zero and 5 volts with a low output impedance.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by U.S. Pat. No. is:

1. A digital pickup comprising a resistance bridge, at least one magneto-resistor being connected in each of two arms of said bridge, a permanent magnet, said magneto-resistors being symmetrically mounted on one pole of said magnet, a solid state switch having set and reset terminals, the output of said bridge being coupled across said set and reset terminals of said switch, said switch comprising an integrated circuit differential amplifier with positive feedback, a junction transistor, and a pair of pickup output terminals coupled to the emitter-collector circuit of said junction transistor.

2. A pickup according to claim 1 including a zener diode coupled across said pair of pickup output terminals.

\* \* \* \* \*